United States Patent

[11] 3,587,043

[72] Inventor Carl Michael Mengani
Brooklyn, N.Y.
[21] Appl. No. 820,211
[22] Filed Apr. 29, 1969
[45] Patented June 22, 1971
[73] Assignee RCA Corporation

[54] CHARACTER PARITY SYNCHRONIZER
5 Claims, 2 Drawing Figs.

[52] U.S. Cl. 340/146.1, 178/69.5, 179/15, 235/153
[51] Int. Cl. H04l 7/00, G08c 25/00
[50] Field of Search 340/146.1; 235/153; 179/15; 178/69.5

[56] References Cited

UNITED STATES PATENTS

| | | | |
|---|---|---|---|
| 3,159,811 | 12/1964 | James et al. | 340/146.1 |
| 3,308,434 | 3/1967 | Glasson et al | 340/146.1 X |
| 3,466,601 | 9/1969 | Tong | 340/146.1 |

*Primary Examiner*—Malcolm A. Morrison
*Assistant Examiner*—Charles E. Atkinson
*Attorney*—Edward J. Norton

ABSTRACT: Character synchronizing bits having a predetermined binary level are generated from a single serial stream of binary parity encoded characters, and once having been generated, continue to be produced independent of the encoded characters for thereafter synchronously processing the encoded characters. Timing disparities between the synchronizing bits and the encoded characters are rapidly detected and a new stream of synchronizing bits is generated when loss of synchronization is manifested.

INVENTOR
Carl Michael Mengani
BY Edward J. Norton
ATTORNEY

*INVENTOR*
Carl Michael Mengani

BY Edward J Norton
*ATTORNEY*

CHARACTER PARITY SYNCHRONIZER

This invention relates to the synchronization of parity encoded characters, and, more particularly, to the generation of character synchronizing bits.

In the transmission of binary encoded messages, the receiving station must decode the transmitted message. Usually, the message is a series of words, which in turn consist of a sequence of characters. These characters may be in the form of any number of two level bits as used in binary systems and referred to as ones and zeros. In order to accurately decode the message, the receiving station must be able to identify and distinguish one character from another. This is achieved by searching for and locking on to synchronizing information included with the transmitted message.

In practice, however, transmission disturbances result in errors in the two level bits. The bits may be omitted or their levels may be distorted, which may result in reversing the one's and zero's. Therefore, the receiver must have the additional capability of detecting and correcting these errors.

Various forms of transmission coding systems have been used to achieve this capability. In one form, parity is employed. In this form, one or more bits is added to each character in order to assign each character a common, unique, identifiable, statistical parameter. Depending on the number of parity bits employed in each character, errors can be detected, located, and corrected.

In self-framing systems, parity information is monitored and used to reframe the received code words by shifting the code words one bit at a time until parity errors are no longer detected. These systems, like others using parity signals, are relatively slow and complex. This complexity results in higher equipment cost.

In other forms, additional synchronizing information is added to the message, words are spaced further apart, or redundant information is added. These tend to reduce channel capacity.

Therefore, it is the primary object of this invention to provide a rapid, self-recovering and low cost self-synchronizing bit generator.

It is a further object to accomplish generation of self-clocking synchronizing bits by utilizing parity bits for synchronizing the sequence of characters in binary encoded messages.

The invention achieves these objects by generating a parity representing bit having a given binary value and occurring in a certain predetermined ordinal bit position for each character so long as the binary value of the parity bit is correct. This parity representing bit is then used to generate a recirculating self-clocking bit in this predetermined ordinal bit position which thereafter exists independently of the parity representing bit. This recirculating self-clocking bit is utilized to synchronize each of the encoded characters of the thereafter received message.

It is a feature of the invention to initially generate a synchronizing self-clocking bit only when the received characters comply with the established parity requirement. As long as the initially received characters comply with this requirement, a synchronizing bit will be continuously generated regardless of subsequent parity failures. However, in one form of synchronization detection, when a predetermined number of successive characters fail to comply with the established parity parameter, a lack of synchronization is indicated. It is another feature of this invention to recognize this lack of synchronization condition and take immediate action to recover synchronization, In this case, the self-clocking synchronizing bit is erased since an out of synchronization condition has been established, and the parity representing bit generator is again utilized to generate a subsequent self-clocking bit.

This invention further provides for error detection, but does so only when the errors are due to predetermined indications of an out of synchronization condition, rather than in response to occasional transmission errors. In addition, as this invention generates a single serial stream of synchronizing bits, rather than a plurality of whole code words in parallel, considerable complexity is avoided, resulting in lower cost equipment especially in the case where long words are used.

Further objects and advantages of the present invention will be more readily apparent upon consideration of the following description when taken in conjunction with the accompanying drawings wherein.

Figure 1:
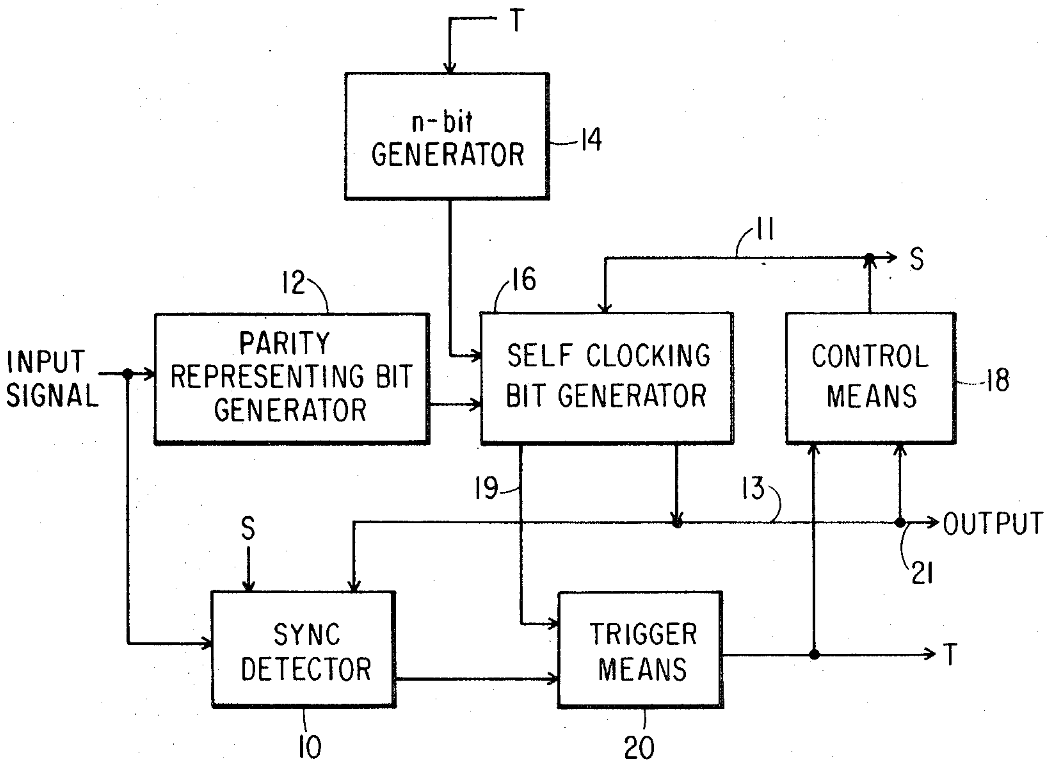
FIG. 1 is a block diagram of a parity controlled self-clocking synchronizing bit generator system according to the present invention.

Referring now to FIG. 1, there is shown a block diagram of a character parity synchronizer to which a single stream of sequential binary encoded $n$-bit characters is applied. Each bit in each of the characters of the applied signal occupies a separate one of the $n$-bit positions, with one of these $n$-bits being a parity bit. This incoming signal is applied to parity representing bit generator 12 and synchronization detector 10.

The character parity synchronizer has a search mode and an operating mode. In the search mode, parity representing bit generator 12 checks the parity of successive bits and generates an output bit, hereinafter noted as (PRB), in a predetermined ordinal bit position in each of the $n$-bit characters for each character only when a preestablished parity requirement is met. This generated (PRB) bit represents a timing marker, always having the same binary value, for each character. The (PRB) bit is then applied to self-clocking bit generator 16. In the meantime, $n$-bit generator 14, in response to a trigger signal (T) from trigger means 20, in a manner to be described below, generates $n$-bits, one bit for each of the bit positions in each successive received character. These $n$-bits are applied to self-clocking bit generator 16. When any of the bits from generator 12 coincide in time with any of the $n$-bits from generator 14, self-clocking bit generator 16 further generates and recirculates bits in these bit positions erasing the remainder of the $n$-bits.

This continual recirculation and comparison cycle shortly reduces the contents of generator 16 to one bit. This one bit will be in time coincidence with the (PRB) bit since the bits in all other bit positions will have been erased due to their random occurrence. This one bit is a self-clocking bit, hereinafter called (SCB), and is now applied to output 13, 21 for synchronizing the received encoded signal. At this time the (SCB) turns on control means 18 along path 13, producing an output signal therefrom on path 11. This output signal allows generator 16 to recirculate the (SCB) independent of generator 12. The system is now in the operating mode.

Once the operating mode is established, errors in the input signal have no effect on the subsequent generation of the recirculating (SCB). Consequently, subsequent relative parity relocations in the received signal may result in a sync error between the (SCB) and the characters in the received signal.

To correct this condition, should it occur, synchronization detector 10 is provided. Detector 10 checks parity in each of the received characters. It is apparent that occasionally parity disparities should not indicate an out of synchronization condition. Therefore, detector 10 is preset to count a predetermined number of successive parity disparities in successive characters. The occurrence of this preset count of successive parity failures, for example three, can be utilized to manifest a loss of synchronization rather than an occasional transmission error. The output of detector 10, upon the occurrence of this manifested sync loss, is applied to trigger means 20. Trigger means 20 produces a trigger signal (T) in response to a signal applied at an input thereto. Signal (T) turns off control means 18 cutting off the output signal on path 11, which erases the (SCB) from generator 16. In addition, signal (T) is applied to $n$-bit generator 14 and a new search cycle is commenced. Should, for any reason, e.g. fades, all bits at the correct binary level be erased from generator 16, this condition is detected by trigger means 20 along path 19. Means 20, in response to this condition, generates the trigger signal (T) and the search cycle is repeated.

Figure 2:
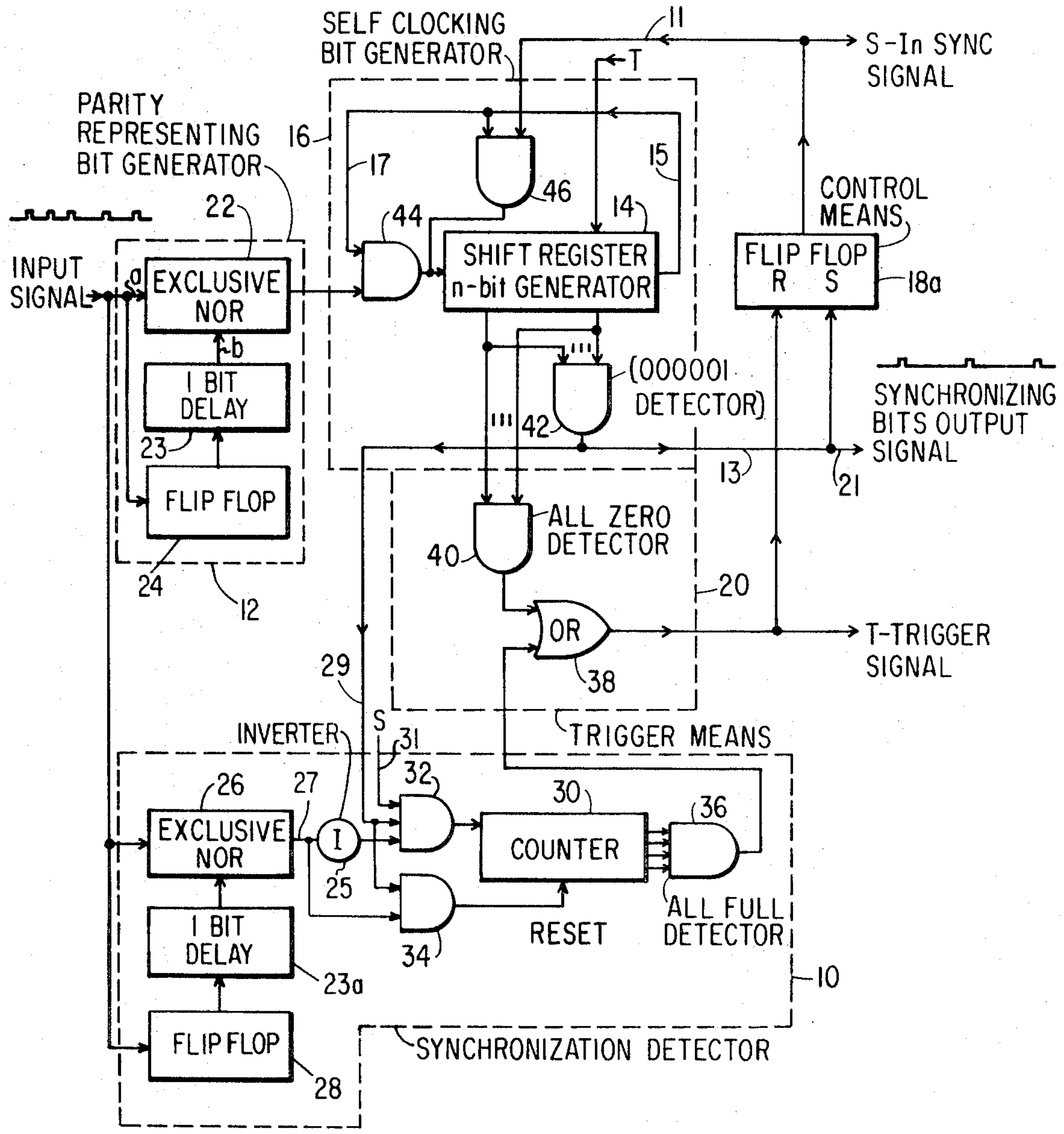
FIG. 2 is a block diagram of one embodiment of a system as shown in FIG. 1 and illustrates a self-clocking synchronizing bit generator system used to generate a stream of synchronizing bits from an incoming signal having a single parity bit per character.

FIG. 2 illustrates one form of the system shown in FIG. 1. The system of FIG. 2 is adapted to respond to an incoming signal having a single parity bit added to each character and wherein even parity is utilized. The number of $n$-bits used in this example including the parity bits is six. It must be noted, however, that the number of character bits, the number of parity bits and their interrelationship are illustrative only. In actual use, the number of character bits may be much larger. The number of parity bits may also vary.

In table A is a grouping of characters and a possible parity code as applied to this example.

TABLE A

| | Character | Parity bit |
|---|---|---|
| Character sequence: | | |
| 1 | 01110 | 1 |
| 2 | 01100 | 0 |
| 3 | 10000 | 1 |
| 4 | 10011 | 1 |
| 5 | 01010 | 0 |

In Table A, the parity bit is either a one or a zero depending on whether the number of one bits in the transmitted character is even or odd. Since in this example, even parity is employed, the parity bit will be a one where the number of ones in the character is odd, and zero where it is even. The preestablished parity requirement in this case, therefore, is a single parity bit representing even parity.

In FIG. 2, the incoming sequence of characters is applied to generator 12 and detector 10. Generator 12, for illustration only, comprises an exclusive NOR circuit 22, a one bit delay circuit 23, and flip-flop 24. Exclusive NOR circuit 22 generates a one output when both input signals at ($a$ and $b$) match, that is, both are zero's or both are one's. A bit at the output of flip-flop 24 is delayed by one bit in time by circuit 23. Flip-flop 24 only changes state for each one applied at an input, the output being a one or a zero.

Table B shows the generation of a (PRB) by generator 12.

TABLE B

| Character sequence | Exclusive NOR circuit 22 — Input (a) | Exclusive NOR circuit 22 — Input (b) (1 bit delay) | Exclusive NOR circuit 22 — Output |
|---|---|---|---|
| 1 | 0 | [1] 0 | 1 |
| | 1 | 0 | 0 |
| | 1 | 1 | 1 |
| | 1 | 0 | 0 |
| | 0 | 1 | 0 |
| nth bit | 1 | 1 | [2] 1 |
| 2 | 0 | 0 | 1 |
| | 1 | 0 | 0 |
| | 1 | 1 | 1 |
| | 0 | 0 | 1 |
| | 0 | 0 | 1 |
| nth bit | 0 | 0 | [2] 1 |
| 3 | 1 | 0 | 0 |
| | 0 | 1 | 0 |
| | 0 | 1 | 0 |
| | 0 | 1 | 0 |
| | 0 | 1 | 0 |
| nth bit | 1 | 1 | [2] 1 |
| 4 | 1 | 0 | 0 |
| | 0 | 1 | 0 |
| | 0 | 1 | 0 |
| | 1 | 1 | 1 |
| | 1 | 0 | 0 |
| nth bit | 1 | 1 | [2] 1 |
| 5 | 0 | 0 | 1 |
| | 1 | 0 | 0 |
| | 0 | 1 | 0 |
| | 1 | 1 | 1 |
| | 0 | 0 | 1 |
| nth bit | 0 | 0 | [2] 1 |

[1] Start.
[2] PBR.

Note that there is always a one bit in the $n$th, or in this case, the sixth bit position of each character at the output of generator 12 regardless of the sequence of ones and zeros in the incoming signal. This bit in the $n$th position is the parity representing bit (PRB) and will always be generated for each character meeting the preestablished parity requirements. Thus, the received encoded message signal is applied to flip-flop 24 and to the input of the exclusive NOR circuit 22. The one bit delayed output of flip-flop 24 is applied to input ($b$) of the exclusive NOR circuit 22. At the output of NOR circuit 22 appears a sequence of bits which always includes at least a one bit in the $n$th position of the received characters.

The self-clocking bit generator 16 includes an $n$-bit generator 14 which may be a shift register or a delay line (not shown) having $n$ stages, or as, in this example, six stages. In response to a trigger signal (T), all six stages of register 14 are set to binary ones. These ones are sequentially circulated by means of path 15, 17 and an AND gate 44. AND gate 44 passes to the shift register 14 only those one bits produced and recirculated by shift register 14 which coincide in time with the one bits produced by generator 12. By referring to Table B, it can be seen that the probability of only 1 one bit occurring repetitively in the six stages of shift register 14 is very high. In this case, by the time the third character is processed, only a single one bit is passed to shift register 14, since AND gate 44 will have erased all other ones.

Recirculation of this one bit is accomplished as follows: A detector 42 produces an output signal only when a bit in the $n$th ordinal position in shift register 14 is present, that is, when a one bit is detected in the last stage and only zeros are present in the other stages. This output signal turns on control means 18 at input (S). Control means 18 may be a flip-flop 18$a$. An output signal from flip-flop 18$a$ is produced for that time period in which no signal is applied to input (R). An input at (R) overrides an input at (S) and switches flip-flop 18$a$ off as further described below. The output signal from flip-flop 18$a$, in sync signal (S), is applied to AND gate 46. A second input of AND gate 46 is the recirculated bits in shift register 14 along path 15. AND gate 46 is enabled whenever one of these recirculated bits is generated, and flip-flop 18$a$ is in the "ON" state. The output of gate 46 is a one bit which then enters shift register 14, delaying the bit a full character, and repeating the cycle. This one bit is now a self-clocking bit (SCB), is self perpetuating, and is independent of any output of AND gate 44, which is effectively bypassed. The output of detector 42 consists of a stream of synchronizing bits, each one of which is in the predetermined ordinal bit position ($n$) of the received sequence of characters. These bits can thereafter be readily adapted at output 21 by means known in the art (not shown) for synchronizing the received characters.

Control means 18 is provided as an additional feature for purposes as follows. In practical applications transmission errors may occur. Suppose that generator 16 produces a self-clocking bit (SCB) and parity errors in nonconsecutive characters occur thereafter. Since these errors are not consecutive, the probability is that they are random, and not a result of a repetitive condition. On the other hand, an out of synchronization condition would be manifested by consecutive errors. Therefore, the decision for random errors should be "No Action." A feature of this invention is that no action is taken with a random condition, as generator 16 will continue to generate (SCB) synchronizing bits until such time as the (SCB) is erased, e.g.: when control means 18 is turned off. This continuous generation is accomplished by AND gate 46 which bypasses AND gate 44 once (SCB) is generated, as noted previously.

Now presume an out of synchronization condition exists between the timing of the self-clocking bits (SCB) and the received characters. To correct this situation, the following feature is provided. At the time that a received character is applied to generator 12, it is also applied to synchronization detector 10. Detector 10 includes an exclusive NOR circuit 26, one bit delay circuit 23$a$, flip-flop 28, AND gate 34, AND gate 32, inverter 25, counter 30, and detector 36. Circuit 26, circuit 23*a*, and a flip-flop 28 perform the same function as generator 12, producing a parity representing bit (PRB) at the output of the circuit 26 which is applied to AND gate 34 and inverter 25. The output of the inverter 25 is applied to one input of the AND gate 32. Also applied to GATE 32 is the in sync signal (S) and the self-clocking bit (SCB) from detector 42 via paths 31 and 29, respectively. Inverter 25 produces a one bit whenever the output of circuit 26 is zero. Gate 32 produces an output pulse whenever a one signal condition is present on each of the paths 27, 29 and 31, or in other words, whenever there is a parity failure in a character. Counter 30 counts these pulses. When all full detector 36 detects a full count in counter 30 which manifests an out of sync condition, in this case, three consecutive errors, an output signal is generated and applied to OR gate 38. The output of gate 38, trigger signal (T), is applied to flip-flop 18*a* at input (R), turning off flip-flop 18*a*, disabling gate 46, and erasing the self-clocking bit (SCB). At the same time, signal (T) triggers generator 14, starting the search mode. In the case of occasional errors as noted above, upon simultaneous receipt of a (PRB) due to receipt of a character meeting the parity requirement, and of the (SCB) from detector 42, AND gate 34 is enabled and generates an output signal resetting counter 30 and thus no action is taken for random errors.

Another feature is provided should unforeseen errors result in erasing all the one bits from generator 16 such that only zeros are present. In this case, detector 40 detects the presence of all zeros in shift register 14 and produces an output signal thereupon. This signal is applied to OR gate 38 whose output is trigger signal (T). As shown in FIG. 2, the trigger means 20 is responsive to the output of sync detector 10 and of all-zero detector 40 to place the system in the search mode. In practice, manually controlled or other means (not shown) can serve to provide additional inputs to the gate 38 to supply the necessary trigger signal to the generator 16 and result in the search mode according to the needs of a particular application. Further, suitable means, not shown, can be connected to the synchronization detector 10 to indicate the occurrence of each parity failure, whether or not it results in a full count in counter 30. Also an output could be taken from flip-flop 18*a* to other means not shown to indicate a loss of sync condition.

In certain instances, during system start up, generator 16 may produce the (SCB) erroneously, prematurely cutting off (PRB) at gate 44. Such a condition may occur during the search mode in which the system starts searching in the middle of a character. As noted in Table B, generator 12 may produce one bits other than a (PRB). These bits may cause the generation of an (SCB) which is not in sync with the received signal. In this case, synchronization detector 10 will detect the "Out of Sync" condition due to repetitive timing errors between the (SCB) and the (PRB), and a new search mode will be initiated.

What I claim is:

1. In combination, first means for receiving *n*-bit binary parity encoded characters and for determining when said encoded characters meet a preestablished parity requirement, said first means being responsive to said characters for generating a serial stream of bits, said generated stream of bits including a parity representing bit in a predetermined ordinal bit position for each encoded character meeting said parity requirement, second means for generating a sequence of *n*-bits and for comparing said sequence of generated *n*-bits in time coincidence with said generated serial stream of bits, said second means operating to recirculate only that one of said sequence of generated *n*-bits which coincides in time with said parity representing bit as a self-clocking bit.

2. The combination as claimed in claim 1, and wherein said second means includes a recirculating register means responsive to the generating of said self-clocking bit to cause said self-clocking bit to be recirculated in said register means independently of the operation of said parity representing bit generating means once said self-clocking bit has been generated.

3. The combination as claimed in claim 2, and including, means responsive to said parity representing bits and to said self-clocking bit for generating an error signal only upon a given number of out-of-time coincidence conditions existing therebetween, said means for generating said self-clocking bit including further means responsive to said error signal to erase said self-clocking bit and cause said means for generating said self-clocking bit to again generate said sequence of *n*-bits for time coincidence comparison with said generated serial stream of bits.

4. In combination, first means for receiving *n*-bit binary parity encoded characters and for determining when said encoded characters meet a preestablished parity requirement, said first means being responsive to said characters for generating a serial stream of bits, said generated stream of bits including a parity representing bit in a predetermined ordinal bit position for each encoded character meeting a preestablished parity requirement, a shift register and means for operating said register to produce a sequence of *n*-bits, said register including *n*-stages, each capable of assuming one of two binary states, means for comparing said sequence of *n*-bits in time coincidence with said serial stream of bits and for recirculating to said register only that one of said sequence of *n*-bits as a self-clocking bit which is in time coincidence with said parity representing bits, means for detecting the state of said *n*-stages when said self-clocking bit is recirculating through said register to cause said self-clocking bit when once generated to recirculate through said register independent of said parity representing bit generating means and said comparing means.

5. The combination as claimed in claim 4 and including, means for comparing said self-clocking bits in time coincidence with said parity representing bits to produce an error signal only upon a given number of out-of-time coincidence conditions existing therebetween, said means for detecting the state of said *n*-stages including further means responsive to said error signal to block said self-clocking bit and cause said sequence of *n*-bits to again be compared by said comparing means in time coincidence with said serial stream of bits to produce a retimed self-clocking bit.